United States Patent
Bond et al.

(10) Patent No.: US 11,645,038 B1
(45) Date of Patent: May 9, 2023

(54) AUGMENTED REALITY HEAD-UP DISPLAY FOR AUDIO EVENT AWARENESS

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US); Hannah Elizabeth Wagner, Berkley, MI (US); Kai-Han Chang, Sterling Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/828,121

(22) Filed: May 31, 2022

(51) Int. Cl.
  *G06F 3/16* (2006.01)
  *G06F 3/01* (2006.01)

(52) U.S. Cl.
  CPC .............. *G06F 3/167* (2013.01); *G06F 3/011* (2013.01)

(58) Field of Classification Search
  CPC ................................. G06F 3/011; G06F 3/167
  See application file for complete search history.

(56) References Cited

U.S. PATENT DOCUMENTS

2015/0061895 A1* 3/2015 Ricci ...................... B60K 28/00 340/902
2017/0291543 A1* 10/2017 Goldman-Shenhar ... B60Q 9/00

\* cited by examiner

*Primary Examiner* — Priyank J Shah
(74) *Attorney, Agent, or Firm* — Vivacqua Crane, PLLC (57) ABSTRACT

An augmented reality head up display system includes an audio microphone array, a driver position tracking device, and an augmented reality head up display. The augmented reality head up display system also includes a controller in electronic communication with the audio microphone array, the driver position tracking device, and the augmented reality head up display, where the controller is programmed to: receive audio data from the audio microphone array corresponding to audio detected by the audio microphone array, classify the audio data as corresponding to an audio event occurring in an environment surrounding the vehicle, and display a graphic corresponding to the audio event on the windscreen of the vehicle using the augmented reality head up display and input from the driver position tracking device.

20 Claims, 5 Drawing Sheets

AUGMENTED REALITY HEAD-UP DISPLAY FOR AUDIO EVENT AWARENESS

INTRODUCTION

The present disclosure relates to an augmented reality head-up display for generating a notification symbol upon the windscreen of a vehicle corresponding to an audio event detected by the vehicle which is relevant to a driving task.

Augmented reality (AR) involves enhancing the real world with virtual elements that are shown in three-dimensional space and that permit real-time interaction with users. A head-up display (HUD) shows information such as, for example, vehicle speed and navigational instructions, directly onto a windscreen of a vehicle, within the driver's forward field of view. Accordingly, the head-up display provides drivers with information without looking away from the road. One possible implementation for augmented reality is an augmented reality head-up display (AR-HUD) for a vehicle. By overlaying images on the windscreen, AR-HUDs enhance a driver's view of the environment outside the vehicle, creating a greater sense of environmental awareness.

However, while current augmented reality head-up displays achieve their intended purpose, there is a need in the art for an improved approach for providing information to vehicle occupants.

SUMMARY

According to several aspects, a display system for a vehicle is provided. The display system includes an audio microphone array and a display. The display system also includes a controller in electronic communication with the audio microphone array and display, where the controller is programmed to: receive audio data from the audio microphone array corresponding to audio detected by the audio microphone array, classify the audio data as corresponding to an audio event occurring in an environment surrounding the vehicle, and display a graphic corresponding to the audio event using the display.

In another aspect of the present disclosure, to classify the received audio data, the controller of the augmented reality head up display system is further programmed to determine an identity of the audio event based on the audio data from the audio microphone array and select the graphic corresponding to the identity of the audio event.

In another aspect of the present disclosure, to classify the received audio data, the controller of the display system is further programmed to identify a direction relative to the vehicle in which the audio event is occurring using the audio microphone array and select the graphic corresponding to the audio event such that the graphic corresponding to the audio event indicates the direction relative to the vehicle in which the audio event is occurring.

In another aspect of the present disclosure, the display system also includes vehicle sensors. The vehicle sensors include at least one of a camera, a lidar system, a radar system, a global positioning system, and an ultrasound system. The vehicle sensors are in electrical communication with the controller. To classify the received audio data the controller of the display system is further programmed to receive context data from the vehicle sensors and determine an environmental context of the audio event based on the context data. To classify the received audio data the controller of the display system is further programmed to identify the audio event based on the audio data from the audio microphone array and the environmental context and generate the graphic corresponding to the audio event such that the graphic corresponding to the audio event identifies the audio event and indicates the environmental context of the audio event.

In another aspect of the present disclosure, to determine the environmental context of the audio event, the controller of the display system is further programmed to determine at least one of an audio event location in the environment and a direction of travel of an object associated with the audio event using the received context data.

In another aspect of the present disclosure, display system also includes a plurality of off-vehicle inputs. The plurality of off-vehicle inputs are in electrical communication with the controller. To classify the received audio data the controller of the display system is further programmed to establish a connection with at least one of the plurality of off-vehicle inputs and receive off-vehicle data relevant to the environment surrounding the vehicle from at least one of the plurality of off-vehicle inputs. To classify the received audio data the controller of the display system is further programmed to determine an environmental context of the audio event based on the received off-vehicle data, identify the audio event based on the received audio data from the audio microphone array and the environmental context, and generate the graphic corresponding to the audio event such that the graphic corresponding to the audio event identifies the audio event and indicates the environmental context of the audio event.

In another aspect of the present disclosure, to determine the environmental context of the audio event, the controller of the display system is further programmed to determine at least one of an audio event location in the environment and a direction of travel of an object associated with the audio event using the received off-vehicle data.

In another aspect of the present disclosure, the display is an augmented reality head up display in electronic communication with the controller and the display system also includes a driver position tracking device in electronic communication with the controller. To display the graphic, the controller of the display system is further programmed to determine a position of a driver of the vehicle using the driver position tracking device, calculate a size, shape, and location of the graphic based on the position of the driver, and display the graphic corresponding to the audio event on a windscreen of the vehicle using the augmented reality head up display and the size, shape, and location.

In another aspect of the present disclosure, the display system also includes a vehicle sensor and an off-vehicle input. The controller of the display system is further programmed to verify the classification of the audio data using vehicle data received from the vehicle sensor and the off-vehicle input.

In another aspect of the present disclosure, the controller of the display system is further programmed to update the graphic corresponding to the audio event based on received audio data from the audio microphone array.

According to several aspects, a method for displaying graphics upon a windscreen of a vehicle to assist a driving task is provided. The method includes receiving audio data from an audio microphone array corresponding to audio detected by the audio microphone array. The method also includes classifying the audio data as corresponding to an audio event occurring in an environment surrounding the vehicle. The method also includes determining the relevance of the audio event to the driving task. The method also includes selecting a graphic corresponding to the audio event in response to determining that the audio event is relevant to the driving task. The method also includes displaying a graphic corresponding to the audio event on the windscreen of the vehicle using an augmented reality head up display and input from a driver position tracking device.

In another aspect of the present disclosure, classifying the audio data further may include receiving context data from a plurality of vehicle sensors, determining an environmental context of the audio event based on the context data, determining an identity of the audio event based on at least one of: the audio data and the context data, and determining a direction relative to the vehicle in which the audio event is occurring based on at least one of: the audio data and the context data.

In another aspect of the present disclosure, receiving context data further may include establishing a connection with an off-vehicle input and retrieving context data relevant to the environment surrounding the vehicle from the off-vehicle input.

In another aspect of the present disclosure, determining the relevance of the audio event to the driving task further may include determining a location of the audio event in the environment surrounding the vehicle based on the audio data and the context data, determining a direction of travel of an object associated with the audio event, and determining the relevance of the audio event to the driving task based on the location of the audio event, the direction of travel of the object associated with the audio event, and the identity of the audio event.

In another aspect of the present disclosure, selecting a graphic further may include selecting the graphic based on the identity of the audio event and the direction relative to the vehicle in which the audio event is occurring.

In another aspect of the present disclosure, determining an identity of the audio event further may include determining the identity of the audio event using a machine learning algorithm trained to identify audio events based on at least one of: the audio data and the context data.

In another aspect of the present disclosure, displaying a graphic further may include determining a position of a driver of the vehicle using a driver position tracking device, calculating a size, shape, and location of the graphic based on the position of the driver, and displaying the graphic on a windscreen of the vehicle using the size, shape and location.

According to several aspects, an augmented reality head up display system for a vehicle is provided. The augmented reality head up display system includes an audio microphone array, a driver position tracking device, and an augmented reality head up display. The augmented reality head up display system also includes a plurality of vehicle sensors, the plurality of vehicle sensors including at least one of a camera, a lidar system, a radar system, a global positioning system (GPS), and an ultrasound system. The augmented reality head up display system also includes a plurality of off-vehicle inputs, the plurality of off-vehicle inputs including at least one of a vehicle-to-everything communication system, a cellular data network, and a database of road data. The augmented reality head up display system also includes a controller in electronic communication with the audio microphone array, the driver position tracking device, the augmented reality head up display, the plurality of vehicle sensors, and the plurality of off-vehicle inputs. The controller is programmed to receive audio data from the audio microphone array corresponding to audio detected by the audio microphone array, determine an identity of an audio event detected in the audio data, and identify a direction relative to the vehicle in which the audio event is occurring using the audio microphone array, the plurality of vehicle sensors and the plurality of off-vehicle inputs. The controller is further programmed to select a graphic corresponding to the identity of the audio event and the direction relative to the vehicle in which the audio event is occurring and display the graphic on the windscreen of the vehicle using the augmented reality head up display and input from the driver position tracking device.

In another aspect of the present disclosure, to determine the identity of the audio event, the controller of the augmented reality head up display system is further programmed to receive context data from the plurality of vehicle sensors, determine an environmental context of the audio event based on the context data, and identify the audio event based on the audio data from the audio microphone array and the environmental context.

In another aspect of the present disclosure, to determine the identity of the audio event, the controller of the augmented reality head up display system is further programmed to establish a connection with at least one of the plurality of off-vehicle inputs and receive off-vehicle data relevant to the environment surrounding the vehicle from at least one of the plurality of off-vehicle inputs. The controller of the augmented reality head up display system is further programmed to determine an environmental context of the audio event based on the received off-vehicle data and identify the audio event based on the received audio data from the audio microphone array and the environmental context.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
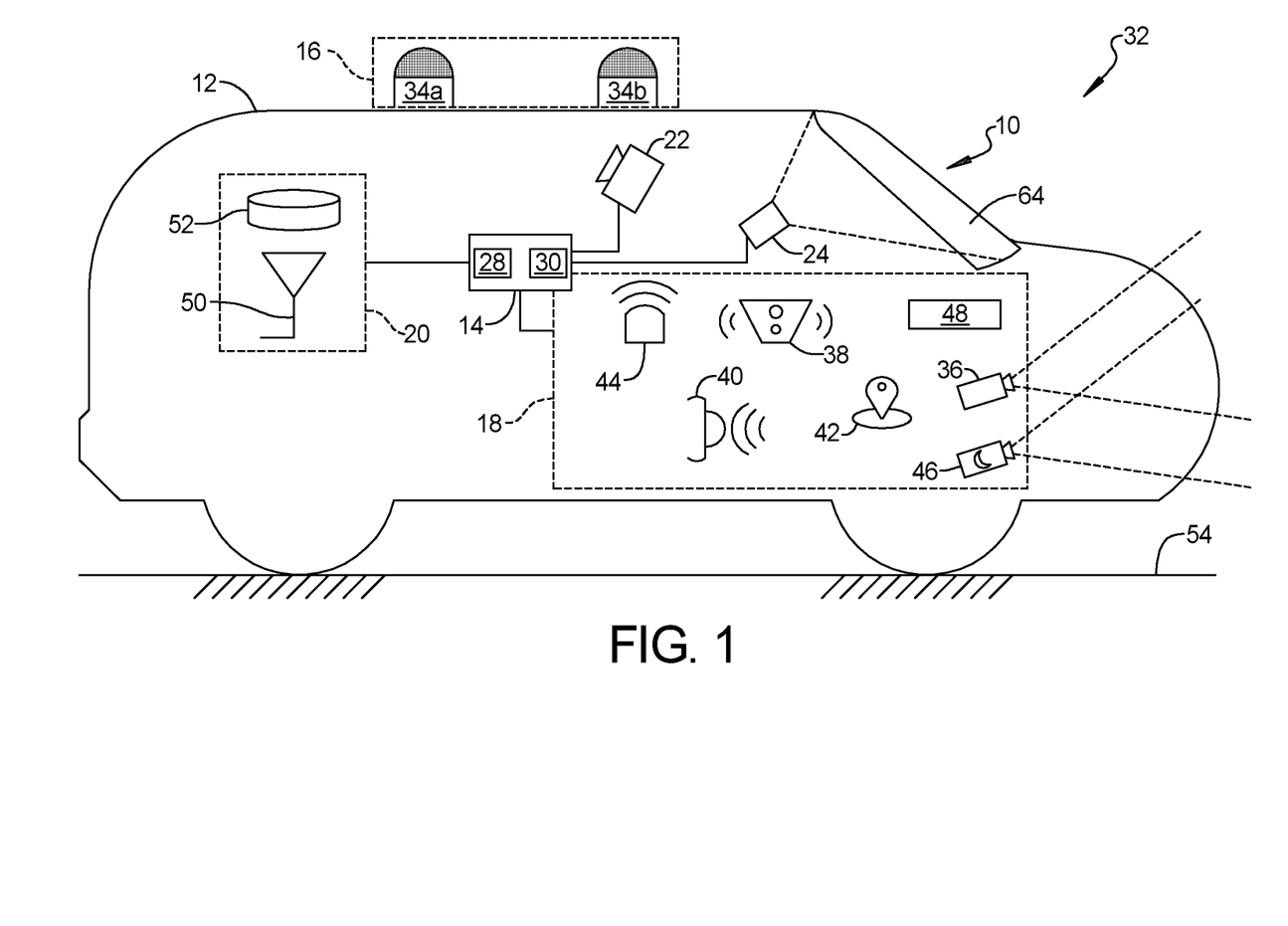
FIG. 1 is a schematic diagram of a display system according to an exemplary embodiment.

Referring to FIG. 1, a display system for displaying a notification symbol upon the windscreen of a vehicle corresponding to an audio event is illustrated and generally indicated by reference number 10. The display system 10 is shown with an exemplary vehicle 12. While a passenger vehicle is illustrated, it should be appreciated that the vehicle 12 may be any type of vehicle without departing from the scope of the present disclosure. The display system 10 generally includes a controller 14, an audio microphone array 16, vehicle sensors 18, off-vehicle inputs 20, a driver position tracking device 22, and an augmented reality head up display (AR-HUD) projector 24. The display system 10 may be used with a head up display (HUD) and/or a human-machine interface (HMI) located in a side-view mirror, rear-view mirror, and/or dashboard of the vehicle 12. In the embodiment of the present disclosure, the display system 10 is an AR-HUD system.

The controller 14 is used to implement a method 100 for displaying a notification symbol upon the windscreen of a vehicle corresponding to an audio event using the display system 10, as will be described below. The controller 14 includes at least one processor 28 and a non-transitory computer readable storage device or media 30. The processor 28 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 30 may include volatile and non-volatile storage in read-only memory (ROM), random-access memory (RAM), and keep-alive memory (KAM), for example. KAM is a persistent or nonvolatile memory that may be used to store various operating variables while the processor 28 is powered down. The computer-readable storage device or media 30 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the audio microphone array 16, the vehicle sensors 18, the off-vehicle inputs 20, the driver position tracking device 22, and the AR-HUD projector 24. The electrical communication may be established using, for example, a CAN bus, a WiFi network, a cellular data network, or the like. One skilled in the art will appreciate that various additional wired and wireless techniques and communication protocols may be used to communicate with the controller 14.

In the present disclosure, the term audio event refers to an identity, location, and context of a sound occurring in the environment 32 surrounding the vehicle 12 detected by the audio microphone array 16. The audio event includes information about an identity of the sound, a location of an object which is determined to be a source of the sound, and a context in the environment 32 in which the sound is occurring. In a non-limiting example, a sound detected by the audio microphone array 16 is identified to be a dog barking, the location of the dog is determined to be a distance in front of the vehicle 12, and the context of the sound in the environment 32 is determined to be that the dog is positioned in between parked vehicles. The audio event may also include information about motion of the object which is determined to be the source of the sound, such as the velocity and/or acceleration of the object.

The audio microphone array 16 is used to detect sounds in the environment 32 surrounding the vehicle 12. The audio microphone array 16 includes a plurality of audio microphones 34a, 34b. The plurality of audio microphones 34a, 34b may be located at various locations on the vehicle 12. In a non-limiting example, the audio microphone array 16 includes two audio microphones 34a and 34b. However, the audio microphone array 16 may include more than the two audio microphones 34a, 34b without departing from the scope of the present disclosure. The audio microphones 34a, 34b are in electrical communication with the controller 14 as described above. Using the plurality of audio microphones 34, 34b, the controller 14 can determine the identity of the sound detected by the audio microphone array 16 and a direction relative to the vehicle 12 in which the object which is the source of the sound is located. The determination of the identity and direction of the sound may be made using a machine learning algorithm of the controller 14, as discussed below in reference to the method 100.

The vehicle sensors 18 are used to gather information about the environment 32 surrounding the vehicle 12, for example, the layout of the environment 32 and/or distance measurements from the vehicle 12 to objects in the environment 32. The information about the environment 32 gathered by the vehicle sensors 18 is used to provide location and context information, which together with the identity and direction of the sound detected using the audio microphone array 16 form an audio event. The information gathered by the vehicle sensors 18 may also be used to assist in the identification of the sound detected by the audio microphone array 16. In a non-limiting example, the vehicle sensors 18 include at least one of a camera 36 configured to view the environment 32 outside of the vehicle, a lidar system 38, a radar system 40, a global positioning system (GPS) 42, an ultrasound system 44, and a night-vision system 46. The plurality of vehicle sensors 18 additionally includes connections to vehicle systems 48 providing information such as a vehicle steering angle, vehicle speed, vehicle braking, and vehicle acceleration. The vehicle sensors 18 are in electrical communication with the controller 14 as described above.

The off-vehicle inputs 20 are used to provide the controller 14 with additional information about the environment 32 surrounding the vehicle 12, for example, information about nearby vehicles or nearby public events. The additional information provided by the off-vehicle inputs 20 is used to provide further identity, location, and context information to the audio event. In a non-limiting example, the off-vehicle inputs 20 include at least one of a vehicle communication system 50 and a database 52. The off-vehicle inputs 20 are in wireless electrical communication with the controller 14 as described above.

The vehicle communication system 50 is used by the controller 14 to communicate with other systems. For example, the vehicle communication system 50 includes capabilities for communication with vehicles ("V2V" communication), infrastructure ("V2I" communication), remote systems at a remote call center (e.g., ON-STAR by GENERAL MOTORS) and/or personal devices. In certain embodiments, the vehicle communication system 50 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the vehicle communication system 50 may include one or more antennas and/or communication transceivers for receiving and/or transmitting signals, such as cooperative sensing messages (CSMs). The vehicle communication system 50 is configured to wirelessly communicate information between the vehicle 12 and another vehicle. Further, the vehicle communication system 50 is configured to wirelessly communicate information between the vehicle 12 and infrastructure or other vehicles. The vehicle communication system 50 is in electrical communication with the controller 14 as described above.

The database 52 contains information about the environment 32 surrounding the vehicle 12. In a non-limiting example, the database 52 may contain information about a roadway surface 54 based on a location of the vehicle 12 as determined by the GPS 42. In another non-limiting example, the database 52 may contain information about public events like concerts which are scheduled to occur in the environment 32 surrounding the vehicle 12. The database 52 may be located in the non-transitory computer readable storage device or media 30 of the controller 14 or on an off-vehicle computer system, such as a server connected to the internet, and in communication with the controller 14 using the vehicle communication system 50 as discussed above. The database 52 may consist of a plurality of databases in communication with each other or in communication with the controller 14 using the vehicle communication system 50 as discussed above.

Figure 2:
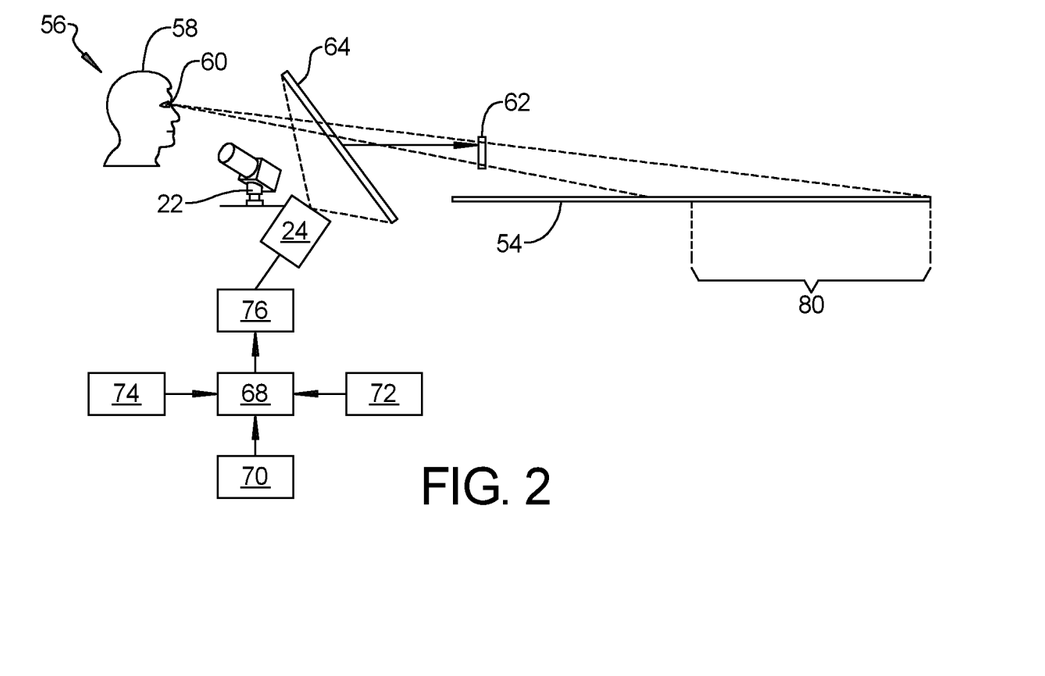
FIG. 2 is a schematic diagram of part of an augmented reality head up display system for displaying graphics on a windscreen of a vehicle according to an exemplary embodiment.

Referring to FIG. 2, the driver position tracking device 22 is used to determine a position of a driver 56 in the vehicle 12. For example, the driver position tracking device 22 may track a position of a head 58 or eyes 60 of the driver 56. The position of the driver 56 in the vehicle 12 from the driver position tracking device 22 is used to locate a graphic 62 (i.e., a notification symbol providing visual information to the driver 56 about the audio event) on a windscreen 64 of the vehicle 12. In an exemplary embodiment, the driver position tracking device 22 is one or more cameras disposed in the vehicle 12. The driver position tracking device 22 is in electrical communication with the controller 14 as described above.

In the present disclosure, the term AR-HUD means an augmented reality head up display that presents information to the driver 56, while still allowing sight of the outside world. In additional exemplary embodiments, a human-machine interface (HMI) located in a side-view mirror, rear-view mirror, and/or dashboard of the vehicle 12 may be used to present information to the driver 56. In the embodiment of the present disclosure, the display system 10 is an AR-HUD system. The AR-HUD uses the AR-HUD projector 24 to display graphics 62 on the windscreen 64 of the vehicle 12. Referring to FIG. 2, the AR-HUD projector 24 and driver position tracking device 22 are shown schematically with an exemplary driver 56 of the vehicle 12. The graphic 62 is indicative of an audio event, as will be described in greater detail below. To operate the AR-HUD, the controller 14 includes multiple software modules, including a system manager 68. During operation of the system 10, the system manager 68 receives at least a first input 70, a second input 72, and a third input 74. The first input 70 is indicative of the position of the vehicle in space (i.e., the vehicle location in space), the second input 72 is indicative of the vehicle driver 56 position in the vehicle 12 (e.g., the position of the eyes and/or head of the driver 56 in the vehicle 12), and the third input 74 is the audio event. The first input 70 may include data such as GNSS data (e.g., GPS data), vehicle speed, roadway curvature, and vehicle steering, and this data is collected from the vehicle sensors 18 and/or the off-vehicle inputs 20. The second input 72 is received from the driver position tracking device 22. The third input 74 is the audio event occurring in the environment 32 surrounding the vehicle 12. The system manager 68 is configured to determine (e.g., compute) the type, size, shape, and color of the graphics 62 to be displayed using the AR-HUD projector 24 based on the first input 70 (i.e., the vehicle location in the environment 32), the second input 72 (e.g., the position of the eyes 60 and/or head 58 of the driver 56 in the vehicle 12), and the third input 74 (i.e. the audio event occurring in the environment 32 surrounding the vehicle 12) The system manager 68 instructs an image engine 76, which is a software module or an integrated circuit of the AR-HUD projector 24 or the controller 14, to display the graphic 62 using the AR-HUD projector 24. The image engine 76 displays the graphic 62 on the windscreen 64 of the vehicle 12 using the AR-HUD projector 24 based on the type, size, shape, and color of the graphic 62 determined by the system manger 68. The graphic 62 is projected on the windscreen 64 by the AR-HUD projector 24 to show the graphic 62 along the roadway surface 54.

Figure 3:
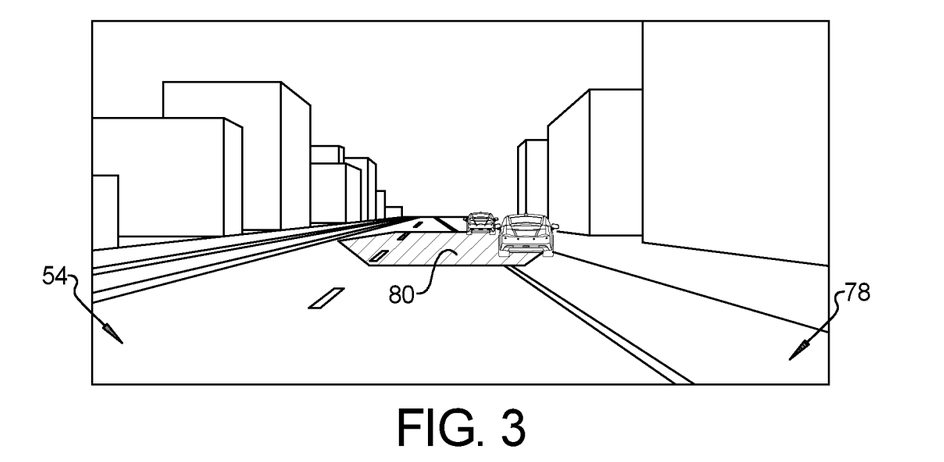
FIG. 3 is a schematic front view of a dual-focal plane augmented reality display, highlighting a second image plane of the dual-focal plane augmented reality display according to an exemplary embodiment.
Figure 4:
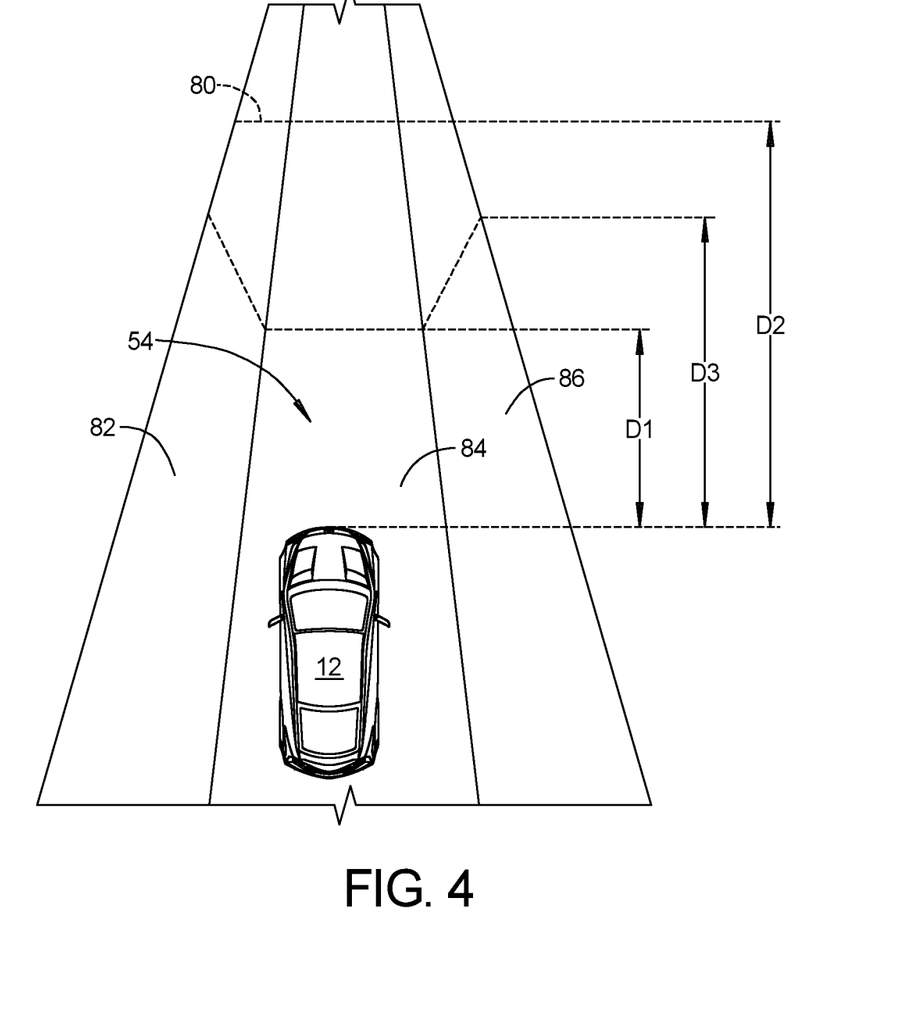
FIG. 4 is a schematic diagram of the second image plane of the dual-focal plane augmented according to an exemplary embodiment.

With reference to FIGS. 3 and 4 and continued reference to FIG. 2, the display system 10 is a dual-focal plane AR-HUD. In this case, the display system 10 has a first image plane 78 and a second image plane 80. The first image plane 78 shows the view of the outside world, and the second image plane 80 is reserved for displaying the graphics 62. The second image plane 80 spans multiple lanes and the graphics 62 appear at a location farther on a roadway surface 54 relative to the first image plane 78. For instance, as shown in FIG. 3, the second image plane 80 covers a left lane 82, a central lane 84, and a right lane 86. As a non-limiting example, in the central lane 84, the second image plane 80 starts at a first predetermined distance D1 (e.g., twenty-five meters) from the vehicle 12 and ends at a second predetermined distance D2 (e.g., ninety meters) from the vehicle 12. Regardless of the specific distances, the second predetermined distance D2 is greater than the first predetermined distance D1 to help the driver 56 see the graphics 62 displayed using the AR-HUD projector 24. In the left lane 82 and the right lane 86, the second image plane 80 is delimited by a sloped boundary (not shown) that starts at the first predetermined distance D1 from the vehicle 12 and ends at a third predetermined distance D3 (e.g., fifty meters) from the vehicle 12. The third predetermined distance D3 is greater than the first predetermined distance D1 and less than the second predetermined distance D2 to help the driver 56 see the graphics 62 displayed using the AR-HUD projector 24. As used herein, the term "dual-focal plane AR-HUD" means a display system 10 that presents images in a first image plane and a second image plane, wherein the first image plane and the second image plane are at different locations. It is desirable to configure the display system 10 as a dual-focal plane AR-HUD to facilitate manipulation of the graphics 62 on the view of the outside word. For instance, by using a dual-focal plane AR display, the size, location, and characteristics of the graphics 62 may be changed based on, for example, the location of the eyes 60 of the driver 56.

Figure 5:
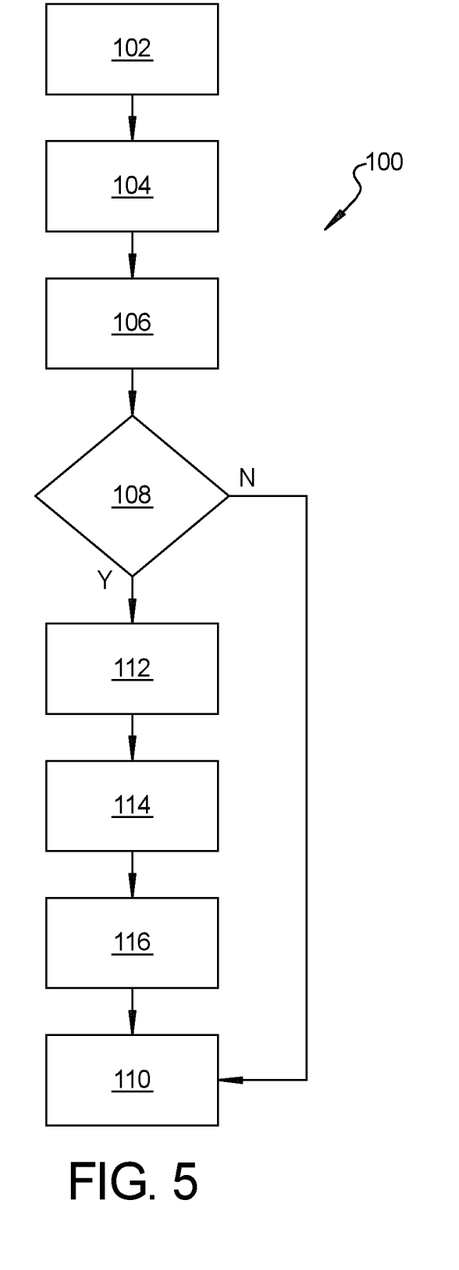
FIG. 5 is a flowchart of a method for displaying graphics upon a windscreen of a vehicle to assist a driving task according to an exemplary embodiment.

Referring to FIG. 5, a flowchart of a method 100 for displaying the graphics 31 upon the windscreen 64 of the vehicle 12 to assist a driving task is shown. The driving task is any activity of the driver 56 related to controlling the vehicle 12 in a safe manner. The method 100 begins at block 102. At block 102, the audio microphone array 16 receives the sound from the environment 32 surrounding the vehicle 12. The method 100 then proceeds to block 104.

At block 104, a location and direction relative to the vehicle 12 of a source of the sound received using the audio microphone array 16 is determined by the controller 14. The direction relative to the vehicle 12 of the source of the sound may be determined using the plurality of audio microphones 34a and 34b of the audio microphone array 16. In a non-limiting example, the direction relative to the vehicle 12 of the source of the sound may be determined based on a phase shift between audio signals received by two audio microphones 34a and 34b. The location of the source of the sound may be determined using at least one of the plurality of vehicle sensors 18. In a non-limiting example, the lidar system 38 of the vehicle 12 may be used to gather data regarding the location of structures in the environment 32 relative to the vehicle 12. The data regarding the location of structures in the environment 32 may be used in conjunction with the direction relative to the vehicle 12 of the source of the sound to determine a location in the environment 32 surrounding the vehicle 12 where the source of the sound is located. The method 100 then proceeds to block 106.

At block 106, the sound received using the audio microphone array 16 at block 102 is classified to determine an identity of the sound. The sound is classified using a software module of the controller 14. The software module of the controller 14 may be programmed to classify the sound using a machine learning algorithm, for example, using a neural network. In a non-limiting example, the machine learning algorithm is trained by providing the algorithm with a plurality of sound samples which have been pre-classified. For example, the plurality of sound samples may include a dog backing, children playing, automobile horns honking, or any other sound found in a driving environment. After sufficient training of the machine learning algorithm, the algorithm can identify sounds received by the audio microphone array 16 with a high accuracy and precision. The vehicle sensors 18 and the off-vehicle inputs 20 may also provide data which is used by the controller 14 to identify the sound. One skilled in the art will appreciate that the controller 14 may be programmed to identify sounds using a variety of additional techniques. After the sound is identified, the method 100 then proceeds to block 108.

At block 108, a relevance determination is made as to whether the sound received using the audio microphone array 16 is relevant to the driving task. The sound may be determined to be relevant to the driving task based on the location, direction of motion, and rate of motion of the source of the sound relative to the location, direction of motion, and rate of motion of the vehicle 12. A sound is relevant to the driving task if the sound may impact or influence the driving task. The relevance determination may be made using data from any one of: the audio microphone array 16, the vehicle sensors 18, and the off-vehicle inputs 20 or a combination of the above. In a non-limiting example, the source of the sound may be classified in block 106 as a snowplow vehicle in an oncoming lane which is separated from a lane in which the vehicle 12 is traveling by a barrier. Therefore, in the aforementioned example, the sound would be determined to be irrelevant to the driving task as the vehicle 12 and the snowplow vehicle are separated by a barrier. If the sound is determined to be irrelevant to the driving task, the method 100 proceeds to enter a standby state at block 110. If the sound is determined to be relevant to the driving task, the method 100 proceeds to block 112.

At block 112, the graphic 62 is selected by the controller 14. The graphic 62 may be selected based on the determinations made in blocks 104 and 106. A plurality of graphics 62 may be located in the non-transitory computer readable storage device or media 30 of the controller 14 or on an off-vehicle computer system, such as a server connected to the internet, and in communication with the controller 14 using the vehicle communication system 50 as discussed above. At block 112, the graphic 62 is selected which indicates the location, direction of motion, and rate of motion of the source of the sound relative to the location, direction of motion, and rate of motion of the vehicle 12 in addition to the identity of the sound. Visual characteristics of the graphic 62, such as size, color, and animation, may be adjusted to indicate urgency of the situation indicated by the graphic. The graphic 62 may also contain animations which indicate the volume and source of the sound. In a non-limiting example, the graphic 62 may flash in a red color to indicate danger caused by a child detected to be playing very near to the roadway surface 54. By repeatedly performing the method 100 and thus also repeatedly performing block 112, the graphic 62 may be updated as the location of the vehicle 12 changes and the environment 32 around the vehicle 12 changes. Examples of graphics 62 are discussed in reference to FIGS. 6A-6E below. The method 100 then proceeds to block 114.

At block 114, the controller 14 calculates a location on the windscreen 64 of the vehicle 12 at which the graphic 62 is to be displayed by the display system 10. The location is determined based on input from the driver position tracking device 22 and the location of the sound source determined in block 104. The method 100 then proceeds to block 116.

At block 116, the display system 10 displays the graphic 62 on the windscreen 64 of the vehicle 12 based on the location determined at block 114. The process of displaying the graphic 62 is discussed in more detail above in reference to FIG. 4. The method 100 then proceeds to block 110, where the method 100 enters a standby state.

Referring to FIGS. 6A-6E, multiple example driver views are shown, including graphics 62 which may be displayed to convey information to the driver. The system 10 and/or the method 100 may be used to identify a mechanical issue with the vehicle 12. In a non-limiting example depicted in FIG. 6A, the vehicle 12 has worn brakes which emit a sound to indicate that they should be serviced. According to the method 100, the system 10 has received and classified the sound and displayed a graphic 62a using the AR-HUD projector 24 which indicates that the brakes of the vehicle 12 should be serviced.

The system 10 and/or the method 100 may further be used to notify the driver about a sound which is emanating from a source which is not visible to the driver through the windscreen 64 of the vehicle 12. In a non-limiting example depicted in FIG. 6B, another vehicle is honking behind the vehicle 12. The graphic 62b indicates the identity of the sound and the direction relative to the vehicle 12 of the source of the sound. This allows the driver to be made aware of events relevant to the driving task of which the driver may otherwise be unaware, especially if the driver is unable to adequately hear sounds outside of the vehicle. For example, the driver may be listening to loud music, or may be hard of hearing. Therefore, the system 10 and/or method 100 may increase driver awareness of the environment 32 and thus safety.

The system 10 and/or the method 100 may further be used to provide the driver with context information about the sound. In a non-limiting example depicted in FIG. 6C, the system 10 and/or method 100 has identified children playing between the parked vehicles 88. Because the system 10 and/or method 100 is able to determine a context (i.e., the location, direction of motion, and rate of motion of the source of the sound relative to the location, direction of motion, and rate of motion of the vehicle 12 and other objects in the environment 32), the system 10 may inform the driver of the context of the sound using the graphic 62c displayed on the windscreen 64 of the vehicle 12.

Figure 6A:
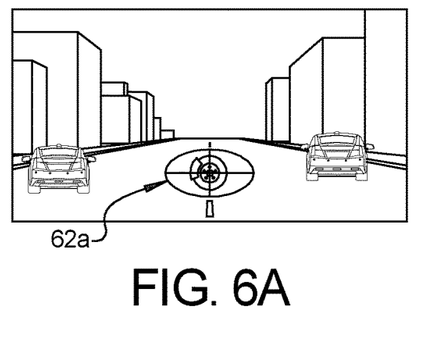
FIG. 6A is a schematic diagram showing an example of graphics displayed upon the windscreen of the vehicle according to an exemplary embodiment.
Figure 6B:
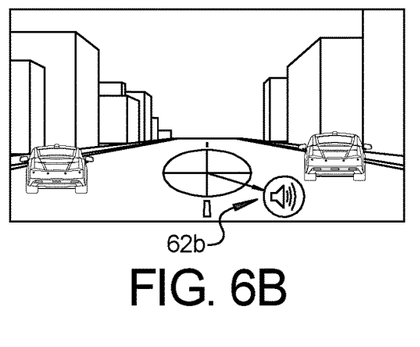
FIG. 6B is a schematic diagram showing an example of graphics displayed upon the windscreen of the vehicle according to an exemplary embodiment.
Figure 6C:
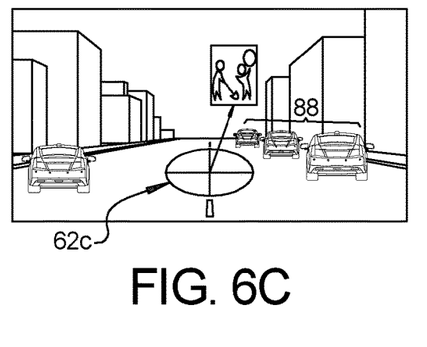
FIG. 6C is a schematic diagram showing an example of graphics displayed upon the windscreen of the vehicle according to an exemplary embodiment.
Figure 6D:
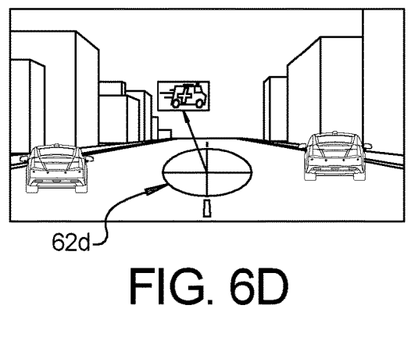
FIG. 6D is a schematic diagram showing an example of graphics displayed upon the windscreen of the vehicle according to an exemplary embodiment.
Figure 6E:
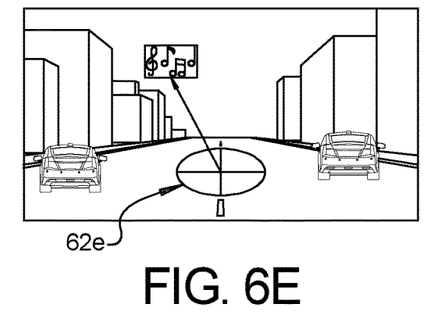
FIG. 6E is a schematic diagram showing an example of graphics displayed upon the windscreen of the vehicle according to an exemplary embodiment.

In a non-limiting example depicted in FIG. 6D, the off-vehicle inputs 20 of the system 10 are utilized in order to communicate with an emergency vehicle which is approaching out of view of the driver. For example, the vehicle communication system 50 may receive a V2V communication from the emergency vehicle indicating its location, rate of travel, and intended route, allowing the graphic 62d to be displayed to the driver according to the method 100.

The system 10 and/or the method 100 may further be used to provide the driver with information to enrich the driving experience. In a non-limiting example depicted in FIG. 6E, a music festival or concert is detected by the system 10 and/or method 100. Using the database 52, the system 10 may retrieve information about the event and use the information to generate the graphic 62e.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A display system for a vehicle comprising:
an audio microphone array;
a head up display;
a driver position tracking device; and
a controller in electronic communication with the audio microphone array, the head up display, and the driver position tracking device, wherein the controller is programmed to:
receive audio data from the audio microphone array corresponding to audio detected by the audio microphone array;
classify the audio data as corresponding to an audio event occurring in an environment surrounding the vehicle; and
display a graphic corresponding to the audio event using the head up display, wherein to display the graphic, the controller is further programmed to:
determine a position of a driver of the vehicle using the driver position tracking device;
calculate a size, shape, and location of the graphic based on the position of the driver; and
display the graphic corresponding to the audio event on a windscreen of the vehicle using the head up display and the size, shape, and location.

2. The display system of claim 1, wherein to classify the received audio data the controller is further programmed to:
determine an identity of the audio event based on the audio data from the audio microphone array; and
select the graphic corresponding to the identity of the audio event.

3. The display system of claim 1, wherein to classify the received audio data the controller is further programmed to:
identify a direction relative to the vehicle in which the audio event is occurring using the audio microphone array; and
select the graphic corresponding to the audio event such that the graphic corresponding to the audio event indicates the direction relative to the vehicle in which the audio event is occurring.

4. The display system of claim 1 further comprising:
vehicle sensors, the vehicle sensors including at least one of: a camera, a lidar system, a radar system, a global positioning system (GPS), and an ultrasound system, wherein the vehicle sensors are in electrical communication with the controller, wherein to classify the received audio data the controller is further programmed to:
receive context data from the vehicle sensors;
determine an environmental context of the audio event based on the context data;
identify the audio event based on the audio data from the audio microphone array and the environmental context; and
generate the graphic corresponding to the audio event such that the graphic corresponding to the audio event identifies the audio event and indicates the environmental context of the audio event.

5. The display system of claim 4, wherein to determine the environmental context of the audio event the controller is further programmed to:
determine at least one of: an audio event location in the environment and a direction of travel of an object associated with the audio event using the received context data.

6. The display system of claim 1 further comprising:
a plurality of off-vehicle inputs, the plurality of off-vehicle inputs including at least one of: a vehicle-to-everything communication system, a cellular data network, and a database of road data, wherein the plurality of off-vehicle inputs are in electrical communication with the controller, wherein to classify the received audio data the controller is further programmed to:
establish a connection with at least one of the plurality of off-vehicle inputs;
receive off-vehicle data relevant to the environment surrounding the vehicle from at least one of the plurality of off-vehicle inputs;
determine an environmental context of the audio event based on the received off-vehicle data; and
identify the audio event based on the received audio data from the audio microphone array and the environmental context; and
generate the graphic corresponding to the audio event such that the graphic corresponding to the audio event identifies the audio event and indicates the environmental context of the audio event.

7. The display system of claim 6, wherein to determine the environmental context of the audio event the controller is further programmed to:
determine at least one of: an audio event location in the environment and a direction of travel of an object associated with the audio event using the received off-vehicle data.

8. The display system of claim 1,
wherein the head up display is a dual-focal plane augmented reality head up display, wherein the dual-focal plane augmented reality head up display includes a first image plane and a second image plane, and wherein at least one of the first image plane and the second image plane are used to display the graphic corresponding to the audio event.

9. The display system of claim 1 further comprising:
a vehicle sensor;
an off-vehicle input; and
wherein the controller is further programmed to:
verify the classification of the audio data using vehicle data received from the vehicle sensor and the off-vehicle input.

10. The display system of claim 1, wherein the controller is further programmed to:
update the graphic corresponding to the audio event based on received audio data from the audio microphone array.

11. A method for displaying graphics upon a windscreen of a vehicle to assist a driving task, the method comprising:
receiving audio data from an audio microphone array corresponding to audio detected by the audio microphone array;
classifying the audio data as corresponding to an audio event occurring in an environment surrounding the vehicle;
determining a relevance of the audio event to the driving task;
selecting a graphic corresponding to the audio event in response to determining that the audio event is relevant to the driving task; and
displaying a graphic corresponding to the audio event on the windscreen of the vehicle using an augmented reality head up display and input from a driver position tracking device, wherein displaying the graphic further includes:
determining a position of a driver of the vehicle using the driver position tracking device;
calculating a size, shape, and location of the graphic based on the position of the driver; and
displaying the graphic on a windscreen of the vehicle using the size, shape and location.

12. The method of claim 11 wherein classifying the audio data further comprises:
receiving context data from a plurality of vehicle sensors;
determining an environmental context of the audio event based on the context data;
determining an identity of the audio event based on at least one of: the audio data and the context data; and
determining a direction relative to the vehicle in which the audio event is occurring based on at least one of: the audio data and the context data.

13. The method of claim 12, wherein receiving context data further comprises:
establishing a connection with an off-vehicle input; and
retrieving context data relevant to the environment surrounding the vehicle from the off-vehicle input.

14. The method of claim 12, wherein determining the relevance of the audio event to the driving task further comprises:
determining a location of the audio event in the environment surrounding the vehicle based on the audio data and the context data;
determining a direction of travel of an object associated with the audio event; and
determining the relevance of the audio event to the driving task based on the location of the audio event, the direction of travel of the object associated with the audio event, and the identity of the audio event.

15. The method of claim 12, wherein selecting a graphic further comprises:
selecting the graphic based on the identity of the audio event and the direction relative to the vehicle in which the audio event is occurring.

16. The method of claim 12, wherein determining an identity of the audio event further comprises:
determining the identity of the audio event using a machine learning algorithm trained to identify audio events based on at least one of: the audio data and the context data.

17. The method of claim 14, wherein calculating the size, shape, and location of the graphic further comprises:
calculating the size, shape, and location of the graphic based on the position of the driver and the location of the audio event in the environment surrounding the vehicle.

18. An augmented reality head up display system for a vehicle, the augmented reality head up display system comprising:
an audio microphone array;
a driver position tracking device;
an augmented reality head up display;
a plurality of vehicle sensors, the plurality of vehicle sensors including at least one of: a camera, a lidar system, a radar system, a global positioning system (GPS), and an ultrasound system;
a plurality of off-vehicle inputs, the plurality of off-vehicle inputs including at least one of: a vehicle-to-everything communication system, a cellular data network, and a database of road data; and
a controller in electronic communication with the audio microphone array, the driver position tracking device, the augmented reality head up display, the plurality of vehicle sensors, and the plurality of off-vehicle inputs, wherein the controller is programmed to:
receive audio data from the audio microphone array corresponding to audio detected by the audio microphone array;
determine an identity of an audio event detected in the audio data;
identify a direction relative to the vehicle in which the audio event is occurring using the audio microphone array, the plurality of vehicle sensors and the plurality of off-vehicle inputs;
select a graphic corresponding to the identity of the audio event and the direction relative to the vehicle in which the audio event is occurring; and
display the graphic on a windscreen of the vehicle using the augmented reality head up display and input from the driver position tracking device.

19. The augmented reality head up display system of claim 18, wherein to determine the identity of the audio event the controller is further programmed to:
- receive context data from the plurality of vehicle sensors;
- determine an environmental context of the audio event based on the context data; and
- identify the audio event based on the audio data from the audio microphone array and the environmental context.

20. The augmented reality head up display system of claim 18, wherein to determine the identity of the audio event the controller is further programmed to:
- establish a connection with at least one of the plurality of off-vehicle inputs;
- receive off-vehicle data relevant to an environment surrounding the vehicle from at least one of the plurality of off-vehicle inputs;
- determine an environmental context of the audio event based on the received off-vehicle data; and
- identify the audio event based on the received audio data from the audio microphone array and the environmental context.

\* \* \* \* \*